United States Patent [19]
Davies et al.

[11] Patent Number: 5,978,539
[45] Date of Patent: Nov. 2, 1999

[54] OPTICAL DEVICE HAVING A TEMPERATURE INDEPENDENT SPECTRAL RESPONSE USING NONPLANAR GEOMETRIC DISTORTION OF A SUBSTRATE

[75] Inventors: Scott T. Davies, Dacula; Daren Li, Marietta; Yuan P. Li, Duluth; Chellappan Narayanan, Alpharetta; Kevin G. Sullivan, Duluth; Jianluo Zhang, Suwanee, all of Ga.

[73] Assignee: Lucent Technologies Inc., Murray Hill, N.J.

[21] Appl. No.: 08/943,747

[22] Filed: Oct. 3, 1997

[51] Int. Cl.$^6$ .............................. G02B 6/10; G02B 6/12
[52] U.S. Cl. .............................................. 385/129; 385/14
[58] Field of Search ..................... 385/129–132, 385/14

[56] References Cited

U.S. PATENT DOCUMENTS

| | | | |
|---|---|---|---|
| 5,136,671 | 8/1992 | Dragone | 385/46 |
| 5,313,535 | 5/1994 | Williams | 385/14 |
| 5,367,589 | 11/1994 | MacDonald et al. | 385/37 |
| 5,615,224 | 3/1997 | Cohen | 372/36 |
| 5,841,920 | 11/1998 | Lemaire et al. | 385/37 |

OTHER PUBLICATIONS

Optical Fiber Telecommunications, Vol. IIIB, Chapter 8, Silicon Optical Bench Waveguide Technology, Lucent Technologies, 1997, pp. 319–376.

Low–Expansion Alloys, M.A. Hunter, Date Unknown.

The Transactions of The IEICE, vol. E73, No. 1, Jan. 1990. "Bridge–Suspended Silica–Waveguide Thermo–Optic Phase Shifter and Its Application to Mach–Zehnder Type Optical Switch," Akio Sugita, Kaname Jinguji, Norio Takato, Katsumi Katho, Masai Kawachi.

IEEE Photonics Technology Letters, vol. 8, No. 3, Mar., 1996. "Eight–Channel Flat Spectral Response Arrayed–Waveguide Multiplexer with Asymmetrical Mach–Zehnder Filters," K. Okamoto, K. Takiguchi, Y. Ohmori.

*ICICE Trans. Electron.*, vol. E76–C, No. 7, Jul., 1993 "8x8 Optical Matrix Switch Using Silica–Based Planar Lightwave Circuits," Masayuki Okuno, Akio Sugita, Tohru Matsunaga, Masao Kawachi, Yasuji Ohmori and Katsumi Katoh.

*Electronics Letters*, vol. 32, No. 1, Jan. 4, 1996. "Vectorial eigenmode calculation for anisotropic planar optical waveguides," P. Lusse, K. Ramm and H.G. Unger.

Amoco Performance Products, Inc.; Price and Data Sheets for Torlon® and AI–10 Engineering Polymers; Mar. 1, 1992.

Hoechst Celanese; Data Sheets for Fortron® PPS; Date Unknown.

Phillips Petroleum Company; Data Sheets for Ryton® PPS; 1995.

*Primary Examiner*—Rodney Bovernick
*Assistant Examiner*—Victoria D. Hao

[57] ABSTRACT

An optical interconnection device has a passive control mechanism for substantially eliminating thermal effects on optical properties of the apparatus Specifically, the interconnection apparatus includes a control material coupled to an optical circuit substrate, wherein the control material has a thermal expansion coefficient that is different than a substrate thermal expansion coefficient. In response to an increase or decrease an ambient temperature, the control material thermally expands or contracts at a different rate than the substrate to create a non-planar substrate distortion transmitted to the core portion, thereby creating a temperature independent optical path length within the optical core portion.

16 Claims, 4 Drawing Sheets

OPTICAL DEVICE HAVING A TEMPERATURE INDEPENDENT SPECTRAL RESPONSE USING NONPLANAR GEOMETRIC DISTORTION OF A SUBSTRATE

FIELD OF THE INVENTION

The present invention relates generally to optical transmission devices which transmit optical signals.

BACKGROUND OF THE INVENTION

FIG. 1($a$) illustrates a well know Bragg grating device 5 formed from silica based optical waveguides. One important application of an integrated optical Bragg grating is the add-drop filter. In performing the add-drop filter function, the waveguides in Bragg grating 5 include a port 1 which receives initial traffic carrying several wavelengths. The dropped wavelength is Bragg reflected and leaves through port 2. The remaining wavelengths pass through the corrugations and leave through port 4. An added wavelength enters port 3, is Bragg reflected and leaves through port 4. FIGS. 1($b$) and 1($c$) illustrate the bands of dropped and passed signals $R_x$ and $T_x$, respectively.

Other devices which provide optical interconnections accomplish optical wavelength multiplexing and demultiplexing using a polarity of closely spaced input waveguides communicating with the input of a star coupler. The output of the star coupler communicates through an optical grating comprising a series of optical waveguides, wherein each of the waveguides differs in length with respect to its nearest neighbor by a predetermined amount. The grating is connected to the input of a second star coupler and the outputs of which form outputs of a switching, multiplexing, and demultiplexing apparatus. Examples of such interconnection apparatuses are disclosed in U.S. Pat. Nos. 5,002,350 and 5,136,671, which are expressly incorporated herein by reference.

The geometry of the above-referenced devices may be such that a polarity of separate and distinct wavelengths each launch into a separate and distinct input port of the apparatus will all combine and appear on a predetermined one of the output ports. In this manner, the apparatus performs a multiplexing function. The same apparatus may also perform a demultiplexing function. In this situation, a polarity of input wavelengths is then separated from the others and directed to a predetermined one of the output ports of the apparatus. An appropriate selection of input wavelengths also permits the switching between any selected input port to any selected output port. Accordingly, these devices are generally referred to as frequency routing devices and, more specifically, wavelength division multiplexers (WDMs). Ideally, the individual wavelength channel position of the WDMs and the associated transmitters should be aligned to a predefined, industry-established wavelength grid referred herein as $\lambda_0, \lambda_1, \lambda_2, \lambda_3 \ldots \lambda_n$.

Unfortunately, however, in practice the wavelengths or center frequencies of both the transmitter and WDM channels drift with time and/or have initial fabrication errors. Such drifting or errors each result in wavelengths of the respective optical devices to not be aligned as desired and thus adversely affect the operation of that device within a communication system. Additionally, ambient temperature affects both the path length and refractive index of WDMs, producing shifts of center frequency of WDM passbands with changes in ambient temperature. To stabilize center frequencies associated with conventional WDM passbands, a temperature controller must be used to stabilize the substrate temperature. The climate control devices require power for operation, thus limiting the use of WDMs to areas where power is accessible, such as central telephone switching offices. Furthermore, the reliability of the heaters and temperature sensors are of concern to some customers who require redundant components to be present to avoid any failure during the lifetime of the device. Moreover, where power is not available to deliver climate control, WDMs may only be configured to have passbands which can tolerate center frequency drifting, thus limiting the number of channels for multiplexing or switch, and increasing the number of WDMs and cost associated with the required signal processing capability.

To date, devices have typically used what may be referred to as a "set and forget" scheme. In other words, existing devices have simply relied on the passband width of the WDM and/or transmitters being lirge enough to tolerate any and all of the wavelengths inaccuracies that may be present due to at least the reasons set above. In such a system, the WDM passband requires a large channel space, therefore significantly limiting the number of channels.

Furthermore, to be effectively used in an increasingly demanding optical communication system of today where WDMs are going to smaller channel spacings, i.e., less than about 50 GHz, and large channel counts, i.e., greater than or equal to about 32 channels, improvement is needed in the ability to provide accurate center wavelength control in a WDM system and integrated device.

With the forgoing disadvantages of prior art optical interconnection devices in mind, it is an object of the present invention to provide an optical transmission device having an optical planar waveguide with temperature independent transmission properties.

It is another object of the present invention to achieve passive control over thermal effects on planar optical waveguidles using non-planar geometric distortion of a substrate which supports the optical waveguides.

Another object of the present invention to eliminate the need for temperature control devices to prevent the shifting of center frequencies for waveguides and optical transmission devices.

Another object of the present invention is to provide WDMs which have small channel spacings having temperature independent center frequencies.

Other objects, features and advantages of the present invention will become apparent upon reading the following specification, when taken in conjunction with the accompanying drawings.

SUMMARY OF THE INVENTION

The present invention relates to an optical interconnection device having optical properties that are substantially independent of changes in ambient temperature. More specifically, the present invention relates to an optical interconnection apparatus having a passive control mechanism for substantially eliminating thermal effects on optical properties of the apparatus.

In a preferred embodiment, the apparatus includes a substrate material having a top portion and a bottom portion. The substrate top portion receives a base material and an optical core portion, wherein the substrate provides structural support to the optical core portion. The preferred embodiment also includes a control material laminated to the substrate bottom portion, wherein the control material has a thermal expansion coefficient which is different than a substrate thermal expansion coefficient. That difference in thermal expansion coefficients between the substrate and control material is critical to the present invention. More specifically, in response to an increase or decrease an ambient temperature, the control material thermally expands or contracts at a different rate than the substrate to create a non-planar substrate distortion transmitted to the core portion, thereby counteracting a temperature dependence of an optical path length within the optical core portion. In the preferred embodiment, the control material has thermal expansion coefficient which is greater than that of the optical substrate material, which creates a compressive force on an optical core of the optical transmission device to counteract thermal expansion of the core.

In the preferred embodiment, the control material comprises a first material layer and a second material layer laminated between the first material layer and the substrate bottom portion, wherein the first material layer has a thermal expansion coefficient which is greater than thermal expansion coefficients of the second material layer and the substrate. Furthermore, the second material layer thermal expansion coefficient is greater than the substrate thermal expansion coefficient. Alternatively, the control material may also comprise a single material have a thermal expansion coefficient which is different than the substrate.

In the preferred embodiment of the present invention, the non-planar distortion of the control material comprises an arcuate shape with respect to a side view of a substrate edge, wherein the core portion is disposed on a concave portion of the arcuate shape, such that the control material imposes a longitudinal compressive force upon the core portion with an increasing ambient temperature. That compressive force counteracts the increase in the refractive index and effective optical path length as compared to an unconstricted, thermally expanding core material.

In the preferred embodiment of the present invention, the core portion of the optical interconnection device comprises a waveguide grating disposed between star couplers. Non-planar distortion of the control material comprises shape of a substantially spherical shell section, wherein the core portion is disposed on a concave portion of the shell section, such that the control material imposes a longitudinal and lateral compressive force upon the core portion with an increasing ambient temperature. Since individual waveguides with the grating have both longitudinal and lateral components, the spherical section control material configuration provides the proper path length control required for maintaining the center frequency at a constant with respect to changing temperature for each waveguide within the waveguide grating.

In the preferred embodiment, the core portion forms a number of passive optical circuits or waveguides. For example, the core portion comprises an optical waveguide grating, switch or multiplexer. Additionally, the top substrate portion further includes a lower cladding material disposed between the optical core portion and the substrate for protecting a bottom portion of the core. Additionally, the optical interconnection device formed in accordance with the present invention also includes an upper cladding material disposed above the optical core portion for protecting the optical core portion.

In a specific alternative embodiment of the present invention, an optical interconnection apparatus includes a passive control mechanism which is coupled to an enclosure for substantially eliminating thermal effects on optical properties of the apparatus. More specifically, the apparatus includes an optical grating comprising a plurality of unequal length waveguides, a substrate having an upper portion for providing structural support to the optical grating, a control material laminated to a substrate bottom portion, the control material having a thermal expansion coefficient greater than a substrate thermal expansion coefficient, whereupon a change in temperature, the control material thermally expands and contracts at a greater rate than the substrate to create a non-planar substrate distortion transmitted to the waveguide grating, thereby counteracting a temperature dependence of an optical path length within the waveguides. More specifically, this embodiment comprises an enclosure for housing the optical circuit, wherein a control material is coupled between optical circuit and an inside portion of the enclosure for passively controlling thermal effects on an optical core portion within the optical circuit. In this embodiment, the optical circuit includes an optical core for conducting a light signal, upper and lower claddings for protecting the core, and a substrate for receiving the cladding and core materials, wherein the substrate provides structural support to the core and cladding materials.

In this embodiment, the control material couples the optical circuit to inside portions of the enclosure to effectuate passivie control of thermal effects on the optical circuit. As discussed above, the control material has a thermal expansion coefficient greater than a substrate thermal expansion coefficient, whereupon a change in temperature, the control material thermally expands and contracts at a greater rate than the substrate to create a non-planar substrate distortion transmitted to the optical circuit, thereby counteracting a temperature dependence of an optical path length within the optical core portion.

The non-planar distortion of the optical circuit within the enclosure comprises a substantially spherical shell section, wherein the waveguide grating is disposed on a concave portion of the shell section. As discussed above, the non-planar distortion configuration imparted from the control material to the core imposes longitudinal and lateral compressive forces upon the waveguide grating with an increasing ambient temperature. Since individual waveguides with the grating have both longitudinal and lateral components, the spherical section distortion configuration provides the proper path length control required for maintaining the center frequency at a constant with respect to changing temperature for each waveguide within the waveguide grating.

Alternative embodiments of the present invention incorporate the control material into any portion of the optical interconnection apparatus. For example, in alternative embodiments, the control material is laminated or coupled to any layer or multiple layers of the optical interconnection device. Specific examples include, but are not limited to, laminating or coupling the control material to the substrate, the core, the upper cladding or lower cladding of a waveguide grating or any layer of an optical interconnection device. Finally, the control material may comprise, without limitation, any solid shape which is necessary to accomplish the purposes of the present invention.

Other objects, features and advantages of the present invention will become apparent upon reading the following specification, when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating principles of the present invention. In the drawings appended hereto, like numerals illustrate like parts throughout the several views.

Figure 1A:
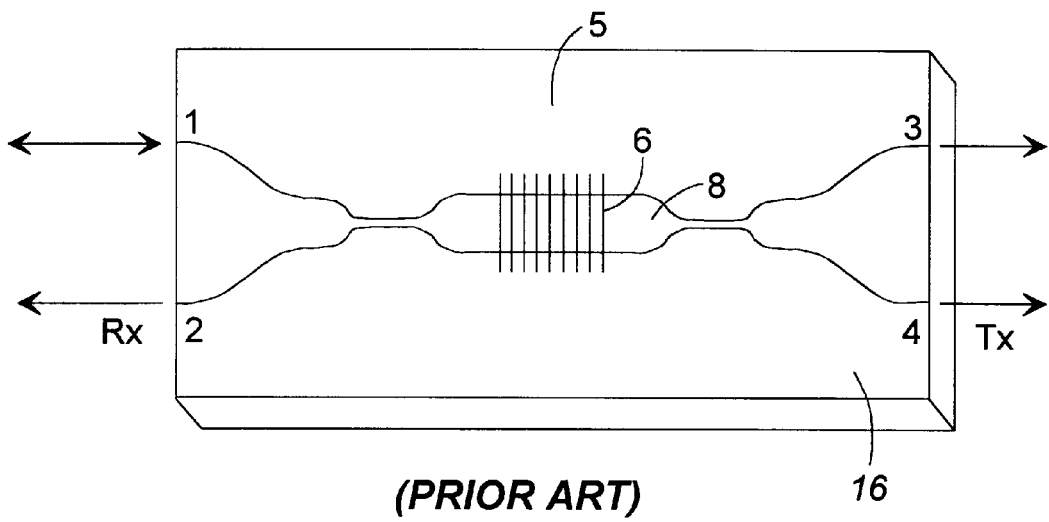
FIG. 1(a) schematically illustrates a conventional Bragg grating device.
Figure 1B:
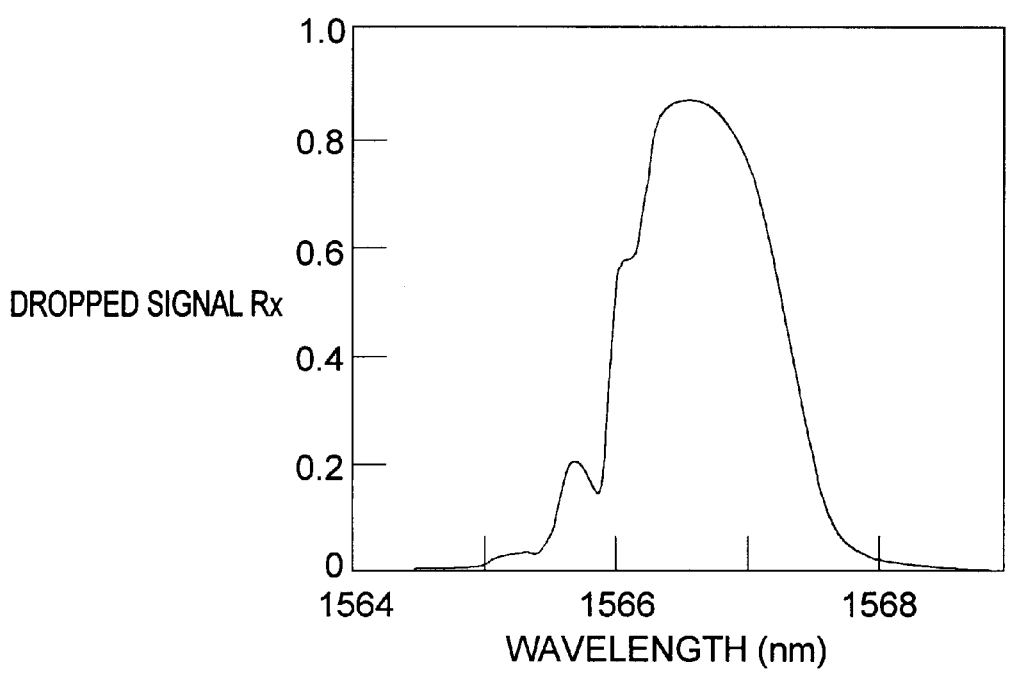
FIGS. 1(b) and 1(c) illustrate the bands of dropped and passed signals $R_x$ and $T_x$, respectively.
Figure 1C:
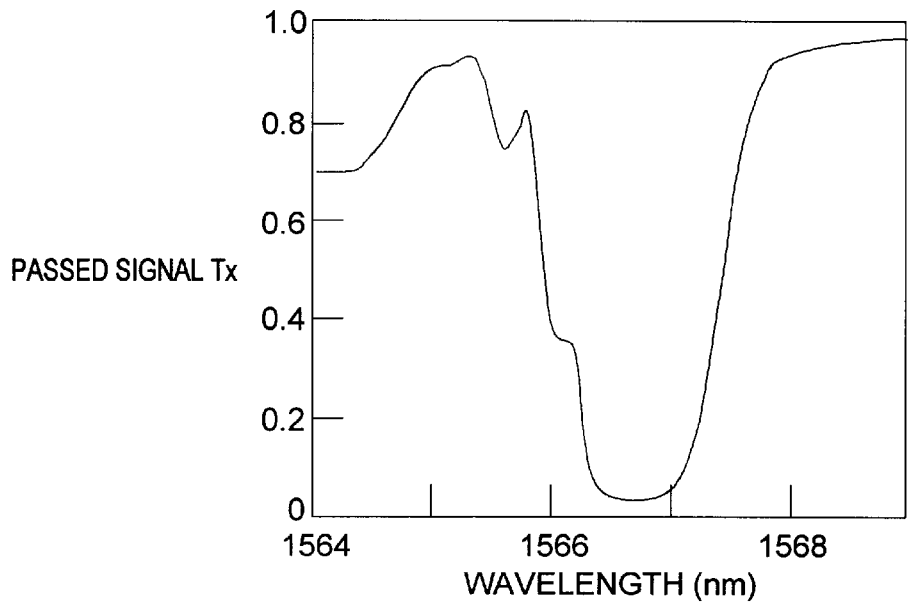

Reference will now be made in detail to the description of the invention as illustrated in the drawings. While the invention will be described in connection with these drawings. there is no intent to limit it to the embodiment or embodiments disclosed therein. On the contrary, the intent is to cover all alternatives, modifications and equivalents included within the spirit and scope of the invention as defamed by the appended claims.

DETAILED DESCRIPTION OF THE PREFERRED EMBODIMENTS

Figure 2:
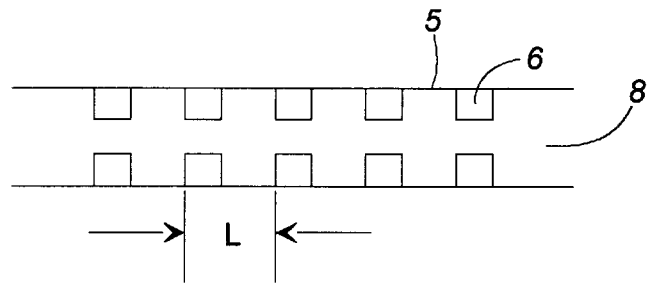
FIG. 2 illustrates a schematic, enlarged partial view of the Bragg grating device of FIG. 1(a).

FIG. 2 illustrates a enlarged schematic view of the corrugation 6 within the grating 5 of a Bragg grating device. Generally speaking, the passband frequency λ is dependent upon generally two known parameters The first parameter is the distance between adjacent corrugations, denoted as L. The second parameter which controls the wave length λ of light reflected is the refractive index n of the core material. Equation 1 below illustrates the relationship between the refractive index n and length L between adjacent corrugations and the center frequency of the reflected light for the Bragg grating illustrated in FIG. 1(a):

$$\lambda = 2nL \tag{1}$$

Figure 4:
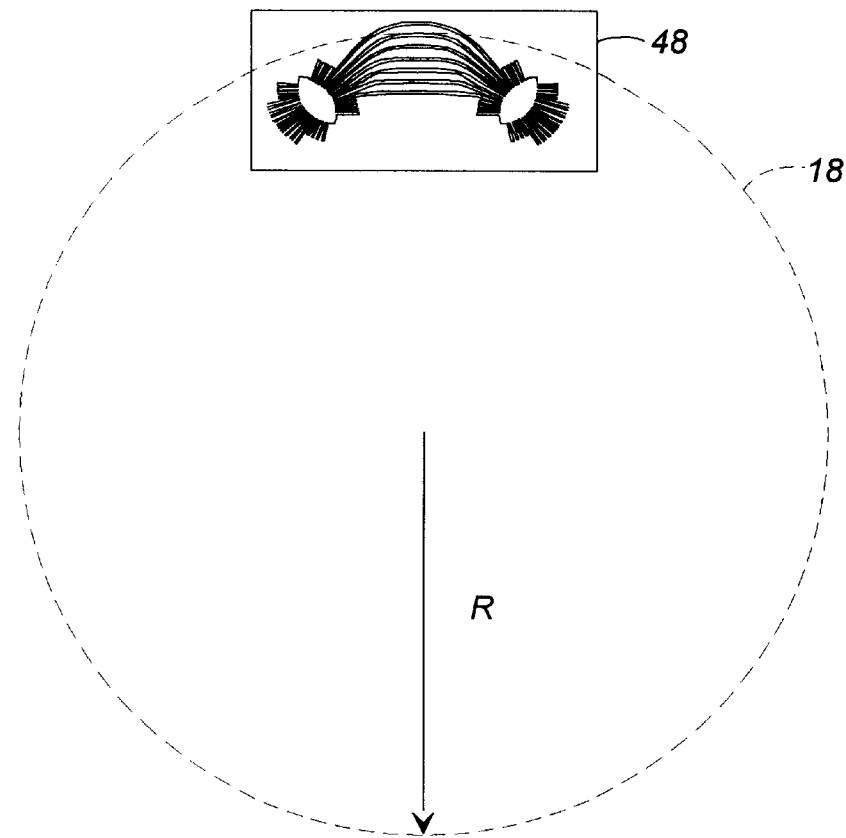
FIG. 4 illustrates a WDM chip on an imaginary wafer shell as illustrated in dashed lines.

Similarly, in a conventional waveguide grating, such as the one illustrated in FIG. 4, the center wavelength of any particular waveguide is given by:

$$\lambda = nL/m \tag{2}$$

where m is the order of the grating, which is an integer, and L is the geometric length difference between adjacent grating waveguides.

As discussed above, Bragg grating devices and other frequency routing devices such as WDMs experience drifting errors resulting from core material optical property dependence upon material temperature. The refractive index of the core material also changes with increasing temperature. For silica, $dn/dT \approx 10^{-5} 1/°C$. However, for many other materials, dn/dT is less than zero. Ideally, the right hand sides of equations (1) and (2) should be equal to a constant which is independent of temperature. Applicants have found the following relationship between temperature changes and the corresponding refractive index n of the core material, which is very close to that of silica:

$$dn/dT \approx 10^{-5} 1/°C. \tag{3}$$

Furthermore, path lengths of individual waveguides in WDMs change with thermal expansion and contraction of the core, which changes the center frequency of the reflected light. Therefore, the center frequency of any channel of a WDM changes when it is bent very slightly or when the WDM material temperature varies. The central wavelength also changes upon bending deformation of the WDM.

Applicants believe there axe several reasons for the change in channel center frequency upon deformation of a WDM. Some of those reasons arise from the fabrication process. Generally, a silicon wafer forms the base of the WDM. Next, an undoped silica ($SiO_2$) base layer or lower cladding is formed on the waver using chemical vapor deposition (CVD) or high pressure steam oxidation. The resulting product is annealed for densifying the glass and for stabilizing the refractive index of the glass. Next, a core layer of P doped silica is deposited on the base or lower cladding and annealed. Masking materials such as silicon, chrome or a combination of photoresist material and silica layers are placed over the base and patterned with photolithography before ion etching through the core. Finally, an upper cladding layer of silica doped with phosphorus (P) and boron (B) is deposited on the core layer. The wafer is then cut into several chips.

Because of fabrication process, the waveguide gratings sit on an imaginary circle defined by the wafer from which the chip was fabricated (approximately), as is illustrated in FIG. 4 by dashed lines. Due to internal stresses introduced by the above-referenced fabrication process, the WDM chip attempts to warp like a part of a spherical surface, wherein the spherical surface has a radius R. When additional stress is applied to the chip, the chip deforms, and radius R changes. Therefore, the length L of the grating waveguide changes with the change in spherical radius. The amount of change in the center wavelength due to change in the radius R may be about 0.4 nm The linear change in the length of the grating waveguides changes according to:

$$\frac{\Delta \lambda}{\lambda} \approx \frac{\Delta L}{L} \tag{4}$$

Thus, there is nearly a proportional relationship between the change in effective length of a waveguide and the center frequency of the waveguide. Taking the change in refractive index and the change in length L resulting from thermal expansion or contraction, resulting relationship between center frequency and temperature is expressed in equation (5) below:

$$d\lambda/dT \approx 0.11 \text{ nm}/°C. \tag{5}$$

Figure 3:
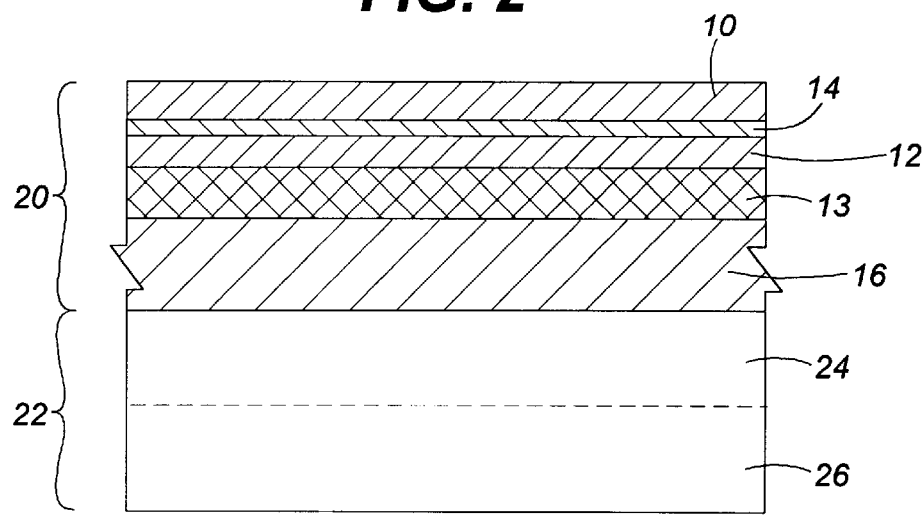
FIG. 3 illustrates a schematic cross-section of an optical transmission device having a passive control material laminated thereto to create a waveguide having a central wave length which is temperature independent utilizing geometric distortion.

To counteract center frequency dependence upon temperature, a passive control mechanism adjusts the curvature of the WDM. FIGS. 3 and 5(a)–5(c) illustrate a temperature independent WDM using the passive control material. Referring now to FIG. 3, a partial cross-section of a waveguide grating have the passive control material laminated thereto. More specifically, the optical circuit 20 includes a silicon substrate 16 formed with or laminated to a base material 13 formed from silica. A top portion of the base 13 includes a core portion 14, a lower clodding 12, and an upper cladding 10. Laminated to or formed to a lower portion of substrate 16 is passive control material 22 which has a greater thermal expansion co-efficient than substrate 16. Control material 22 may simply be formed from a single material having a greater thermal expansion coefficient than the substrate 16. The passive control material may be formed from a number of materials, for example materials 24 and 26, wherein material 26 has a greater thermal expansion coefficient than that of material 24, and material 24 has a greater thermal expansion coefficient than that of substrate 16 and core portion 12. Those materials may be formed from, but are not limited to low-expansion alloys such as INVAR, or engineering polymers such as polyamide-imide or other low thermal expansion polymers.

More specifically, the INVAR alloy may comprise a low expansion alloy of iron and nickel suitable for use in bimetallic or thermostatic strips. Such alloys may have a thermal expansion coefficient ranging from a small negative value ($-0.5 \times 10^{-4}$/° C.) to a large positive value ($20 \times -10^{-4}$/° C.). The ordinarily skilled artisan will understand that percentages of iron and nickel may be varied to achieve the correct thermal expansion coefficient match required to counteract thermal effects on center frequency characteristics of waveguides. Such an alloy may be laminated to and optical transmission device by any known means, including strong, durable adhesives.

Another example of a material which may be suitable for use as passive control material 22 is a polyamide-imide having the tradename Torlon® sold and distributed by Amoco Performance Products, Inc. having an address at 375 Northridge Road, Suite 600, Atlanta, Ga. 30350. A key advantage of the Torlon® resin is that its thermal expansion coefficients are easily matched with that of metallic components. The thermal expansion coefficient of filled Torlon® is very close to that of metal. Specifically, Torlon® 5030 has a thermal coefficient expansion close to that of aluminum. More specifically, the Torlon® 5030 thermal expansion coefficient is approximately $4.8-5.0 \times 10^{-6}$/° C.

Another suitable polymer for use with the present invention as a control material 22 is Ryton® PPS manufactured by Phillips Chemical Company, a division of Phillips Petroleum Company, Post Office Box 7777, Bartlesville, Okla. 74005-7777. Depending upon the types of fillers utilized in that polymer, the coefficient of thermal expansion for Ryton® is 4.2–4.0/° C. for a temperature range of −30°–80° C. and 18–8.0/° C. for a temperature range of 120–240° C.

In operation, the control material applies a bending stress in a temperature dependent manner by using materials with different thermal expansion co-efficient. In that manner, the $d\lambda/dT$ set out in equation (4) can be canceled. Thus, the control material 22 thermally expands at a much greater rate than the substrate 16, cladding 12, core 14 and cladding 10.

Figure 5A:
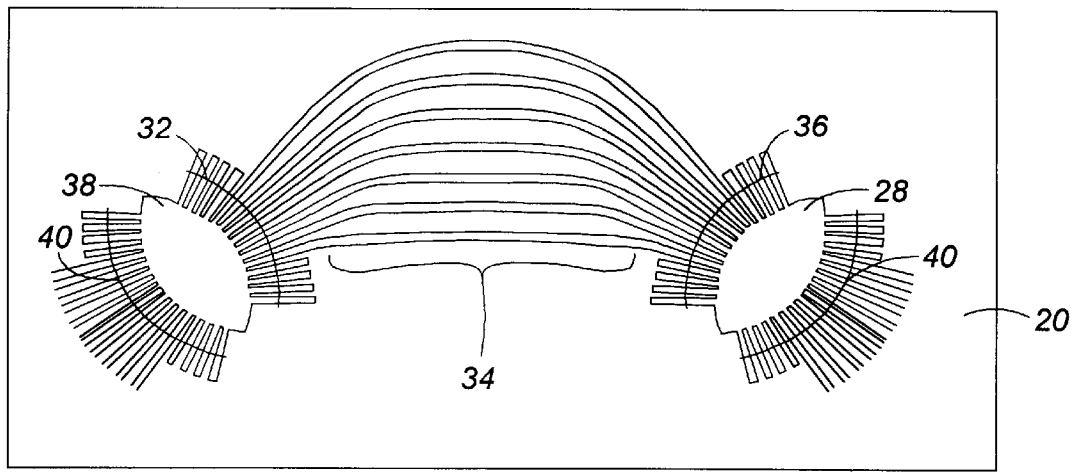
FIGS. 5(a)–5(c) illustrate input and output star couplers coupled to a waveguide grating which are laminated to a substrate and control material that form into a non-planar shape with changes in ambient temperature.
Figure 5B:
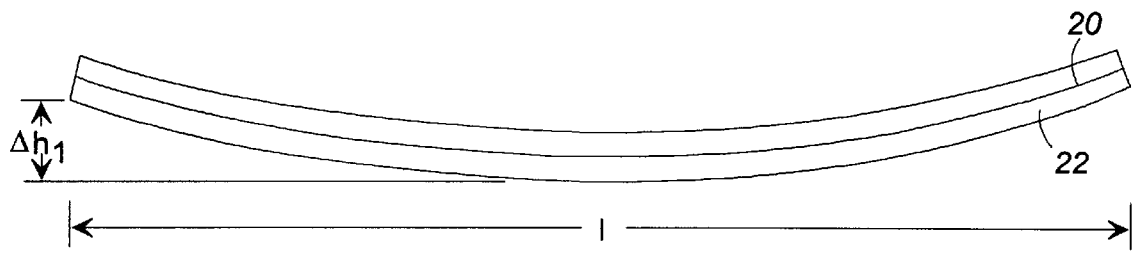
Figure 5C:
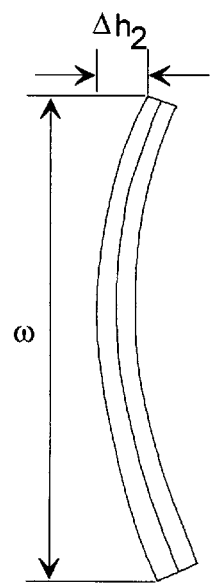

The resulting deformation geometry is illustrated in FIGS. 5(a–c). FIG. 5(a) illustrates an optical circuit on substrate 20 including a star coupler 30, an output waveguide array 32 connected to a symmetrical optical defraction grating 34 within the WDM, having a plurality of optical lengths. Each waveguide is connected to yet another input waveguide array 36 which leads to another star coupler 38, the output of which is connected to output array guide 40. For a substrate 20 which supports the WDM, wherein the substrate has a length l equal to approximately 8.0 cm, edge distortion along the length, $\Delta h_1$, is equal to approximately 0.1 mm, which corresponds to a change in control material temperature from 20° C. to 70° C. Similarly, for a width w of approximately 3.0 cm upward distortion of the substrate edges is approximately 0.038 cm corresponds to a control material from 20° C. to 70° C. As seen from FIGS. 5(a), 5(b) and 5(c), with an increase in temperature, the control material 22 expands at a greater rate than substrate 20 such that non-planar deformation of the control material resembles that of a spherical shell section, wherein the WDM is located on the concave portion, such that the waveguides are compressed in both lateral and longitudinal directions. This two dimensional compression is important so that both vertical and horizontal components of the waveguides are affected, since the waveguides are not orientated in a perfectly parallel orientation with respect to a longitudinal axis of the substrate.

Figure 6:
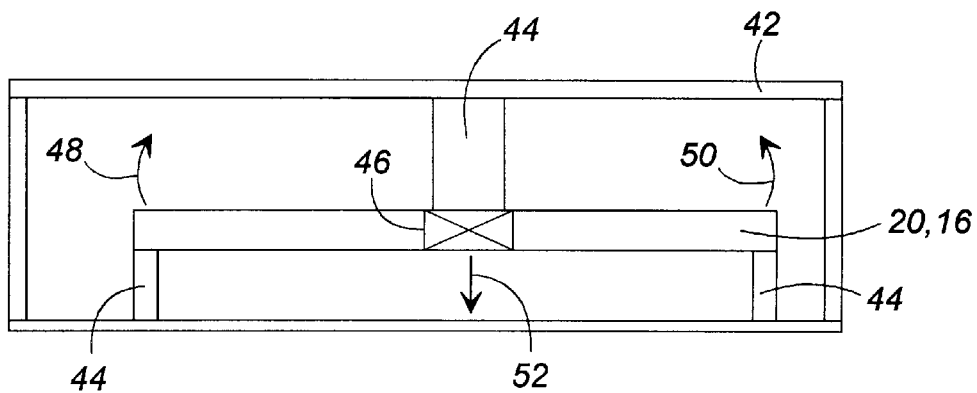
FIG. 6 illustrates an enclosure which houses an optical interconnection device employing control materials which couple the optical interconnection device to an inside portion of the container and which eliminates thermal effects on optical properties of the interconnection apparatus.

FIG. 6 illustrates a schematic sectional view of an alternative embodiment of the present invention wherein the control material is coupled between an enclosure and the WDM. Specifically, this embodiment may include an enclosure 42, formed from a material having a low thermal expansion coefficient, which houses a standard optical circuit 20 and substrate 16. Examples of materials which may form enclosure 42 are not limited to, but may include alloys having a low coefficient of thermal expansion or other materials having a low coefficient of thermal expansion, such as ceramics. Control material blocks 44, which are formed from a material having a high thermal expansion coefficient, such as aluminum, couple the optical circuit 20 to an inside portion of the enclosure 42. Additionally, control material blocks 46 contact longitudinal ends of the optical circuit 20 and substrate 16. Other materials which may form the control material blocks are not limited to, but may include materials which have been discussed above for use as control material 22.

In operation, control blocks 44 expand under increased ambient temperature and bend the optical circuit in the directions indicated by 48, 50 and 52, such that a top portion of the circuit which carries the optical core portion is compressed to counteract the effects of an increasing ambient temperature on center frequencies of waveguides having narrow passbands. Additionally, control material blocks 46, which couple ends of the optical circuit to inside surfaces of the enclosure ends, expand under increasing ambient temperature and serve to bend and compress the optical circuit into a concave up position to implement passive control over the optical path length.

The foregoing description has been presented for purposes of illustration and description. It is not intended to be exhaustive or to limit the invention to the precise forms disclosed. Obvious modifications or variations are possible in light of the above teachings. For example, the control material may comprise, without limitation, any thermal expansion coefficient which is different than that of the substrate, core, cladding material, or any other material within a particular optical interconnection device. Furthermore, the present invention may incorporate the control material into any portion of the optical interconnection apparatus. For example, the control material may be laminated or coupled to, without limitation, any layer or multiple layers of an optical interconnection device. Specific examples may include, but are not limited to, laminating or coupling the control material to the substrate, the core, the upper cladding or lower cladding of a waveguide grating or any layer of an optical interconnection device. Finally, the control material may comprise, without limitation, any solid shape which is necessary to accomplish the purposes of the present invention.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An optical apparatus having a passive control mechanism for substantially eliminating thermal effects on optical properties of the apparatus, the apparatus comprising:

an optical waveguide structure having a core portion and a cladding portion, the optical waveguide structure having a plurality of optical waveguides arranged to create a number of optical paths, the optical waveguide structure being disposed on a substrate;

a control material coupled to the substrate, the control material having a first coefficient of thermal expansion and the substrate having a second coefficient of thermal expansion, the first coefficient of thermal expansion differing from the second coefficient of thermal expansion, wherein a substantially spherical shell distortion of the optical waveguide structure, the substrate, and the control material is formed in response to a temperature of the optical waveguide structure, the substrate, and the control material, the optical waveguide structure being disposed on a concave side of the substantially spherical shell distortion; and wherein both a longitudinal compressive force and a lateral compressive force is applied to the core portion by the substantially spherical shell distortion, thereby counteracting a thermal effect on a center frequency characteristics of the optical waveguide structure.

2. The apparatus of claim 1, wherein the control material having a first coefficient of thermal expansion further comprises:

a first material layer having a third coefficient of thermal expansion; and a second material layer coupled between the first material layer and a bottom portion of the substrate, the second material layer having a fourth coefficient of thermal expansion, the second, third, fourth coefficients of thermal expansion being different from one another.

3. The apparatus of claim 2 wherein the fourth coefficient of thermal expansion is greater than the second coefficient of thermal expansion.

4. The apparatus of claim 1, wherein the optical waveguide structure further comprises an optical waveguide grating.

5. The apparatus of claim 1, wherein the optical waveguide structure further comprises an optical waveguide switch.

6. The apparatus of claim 1, wherein the optical waveguide structure further comprises a wavelength division multiplexer.

7. The optical unit of claim 1, wherein the control material comprises a metallic alloy.

8. The optical unit of claim 1, wherein the control material comprises a polymeric material.

9. An optical apparatus having a passive control mechanism for substantially eliminating thermal effects on optical properties of the apparatus, the apparatus comprising:

a wavelength division multiplexer having a core portion and a cladding portion, the optical waveguide structure having a first star coupler and a second star coupler with a symmetrical optical defraction grating therebetween, the optical waveguide structure being disposed on a substrate;

a control material coupled to the substrate, the control material having a first coefficient of thermal expansion and the substrate having a second coefficient of thermal expansion, the first coefficient of thermal expansion differing from the second coefficient of thermal expansion, wherein a substantially spherical shell distortion of the optical waveguide structure, the substrate, and the control material is formed in response to a temperature of the optical waveguide structure, the substrate, and the control material, the optical waveguide structure being disposed on a concave side of the substantially spherical shell distortion; and wherein both a longitudinal compressive force and a lateral compressive force is applied to the core portion by the substantially spherical shell distortion, thereby counteracting a thermal effect on a center frequency characteristics of the optical waveguide structure.

10. The apparatus of claim 9, wherein the control material having a first coefficient of thermal expansion further comprises:

a first material layer having a third coefficient of thermal expansion; and a second material layer laminated between the first material layer and a bottom portion of the substrate, the second material layer having a fourth coefficient of thermal expansion, the second, third, fourth coefficients of thermal expansion being different from one another, wherein the third coefficient of thermal expansion is greater than the second and fourth coefficients of thermal expansion.

11. The apparatus of claim 10 wherein the fourth coefficient of thermal expansion is greater than the second coefficient of thermal expansion.

12. The optical unit of claim 9, wherein the control material comprises a metallic alloy.

13. The optical unit of claim 9, wherein the control material comprises a polymeric material.

14. An optical device having a passive control mechanism for substantially eliminating thermal effects on optical properties of the device, comprising:

an optical circuit disposed on a substrate, the optical circuit having a core portion and a cladding portion, the substrate having a first coefficient of thermal expansion;

an enclosure housing the optical circuit; and a number of control blocks comprising a control material, the control blocks coupling the optical circuit to an inside portion of the enclosure, the control material having a second coefficient of thermal expansion, the second coefficient of thermal expansion being greater than the first coefficient of thermal expansion, wherein a non-planar spherical distortion of the substrate and the optical circuit is generated by the control blocks in response to a changing temperature, thereby counteracting a temperature dependence of an optical path length within the core portion.

15. The optical device of claim 14, wherein the control material comprises a metallic alloy.

16. The optical device of claim 14, wherein the control material comprises a polymeric material.

* * * * *